United States Patent [19]

Leonardsson

[11] Patent Number: 4,521,025
[45] Date of Patent: Jun. 4, 1985

[54] SEAL DEVICE

[75] Inventor: Per-Erik Leonardsson, Rönninge, Sweden

[73] Assignee: ITT Industries, Inc., New York, N.Y.

[21] Appl. No.: 606,440

[22] Filed: May 3, 1984

[30] Foreign Application Priority Data

May 13, 1983 [SE] Sweden ............................. 8302726

[51] Int. Cl.³ ............................................. F16J 15/36
[52] U.S. Cl. ......................................................... 277/89
[58] Field of Search ................................. 277/81 R, 89

[56] References Cited

U.S. PATENT DOCUMENTS

| 2,939,730 | 6/1960 | Turdin | 277/89 |
| 3,391,942 | 7/1968 | Wilson | 277/89 |
| 4,386,785 | 6/1983 | Back | 277/89 |

Primary Examiner—Robert I. Smith
Attorney, Agent, or Firm—John T. O'Halloran; Peter R. Ruzek; Mary C. Werner

[57] ABSTRACT

The invention concerns a seal device comprising a rotating and a non rotating seal ring, a so-called mechanical seal.

The rotating (2) and non rotating (3) rings are pressed towards each other by an elastic socket (4) surrounding the shaft (1).

4 Claims, 1 Drawing Figure

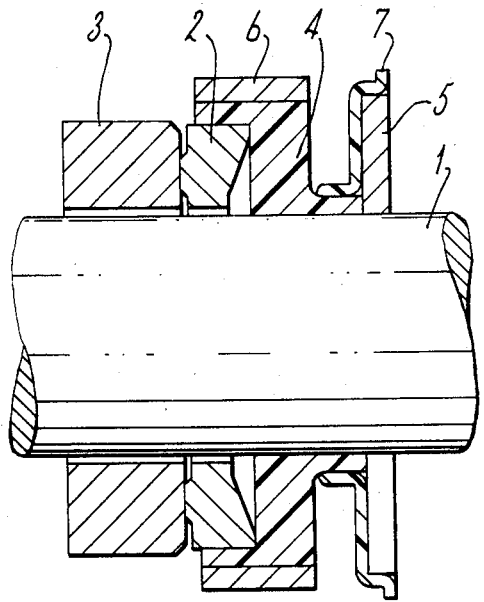

SEAL DEVICE

Subject application concerns a seal device for shafts comprising a rotating and a non rotating seal ring which are pressed towards each other by spring force, so-called mechanical seals.

Such seals are normally used in different types of machines containing rotating shafts for instance submersible machines such as pumps and turbines.

One of the problems involved is to attach the rotating ring rigidly to the shaft, especially if the latter must not be weakened by key ways. This problem has been solved by help of a special grip ring which locks the seal housing at a suitable location on a plain shaft. Compare U.S. Pat. No. 4,140,322 which corresponds to Swedish Pat. No. 7700504-9.

When pumping extremely polluted liquids or liquids giving layers in the pump units, such as waste water from dairies and lime industries, the problem arises that a concentration of such layers may fill the space around the seal in such a way that the spring force between the two seal rings is eliminated.

In order to protect the seal from that, a protection socket for the seal is arranged, which socket also obtains the needed springforce.

The invention is thus characterized by that the spring force is obtained by an elastic socket, for instance made of rubber, arranged around the shaft and which is non-rotatable attached to the shaft by a fastening ring and which is also pressed towards the rotating seal ring.

The invention is described more closely below with reference to the drawing which shows the seal device of this invention in section surrounding a shaft.

In the drawing 1 stands for a rotating shaft, 2 and 3 a rotating and a non-rotating seal ring respectively, 4 a resilient socket, 5 a grip ring and 6 and 7 attachement means for the socket.

The seal ring 2 is thus meant to rotate with the shaft, while the seal ring 3 is attached to non rotating parts in the machine. The spring force is obtained by a socket 4 made of flexible material, such as rubber, which may be reinforced with an insert of rigid material.

The socket 4 and the seal ring 2 are connected since the socket 4 concentrically surrounds a part of the seal ring 2 and since a pipe 6 is pressed around the socket 4 while the socket is plastically deformed.

In order to insure that the socket 4 rotates with the shaft 1 in an appropriate way, a fastening ring 7 is arranged around the socket 4 which presses the latter towards the shaft 1. The ring 7 is connected to a grip ring 5 rigidly attached to the shaft, which ring locks the seal device on the shaft according to the above mentioned Swedish patent. The socket 4 will then be so firmly pressed between the shaft and the fastening ring which is attached to the shaft, that a perfect driving is obtained.

The socket thus serves as a spring for pressing the two seal rings towards each other as well as a protection against incoming pollutants.

I claim:
1. A sealing device for a shaft comprising:
   a first sealing ring having an end face and which is positioned around the shaft in non-rotatable engagement therewith;
   a second sealing ring disposed adjacent said end face and being mounted for rotation with the shaft;
   a resilient protection member which is secured to the shaft and is positioned on a portion of said second sealing ring to prevent accumulation of pollutants around said second sealing ring;
   first gripping means clamped onto said resilient protection member for applying at least radial forces to said protection member which cause the latter to axially expand and urge said second sealing ring into contact with said end face of said first sealing ring; and
   second gripping means attached to the shaft and contacting said first gripping means for preventing radial movement of said protection member.

2. The device as claimed in claim 1 wherein said first gripping means includes a fastening ring.

3. The device as claimed in claim 2 wherein said first gripping means additionally includes a plastically deformed tubular member positioned on a radially outer surface of said protection member.

4. The device as claimed in claim 1 wherein said second gripping means is a grip ring which is non-rotatably attached to the shaft.

* * * * *